C. H. WITTHOEFFT.
FORM AND MOLD FOR MAKING CONCRETE BUILDINGS.
APPLICATION FILED NOV. 17, 1910.
1,013,632.
Patented Jan. 2, 1912.
6 SHEETS—SHEET 4.
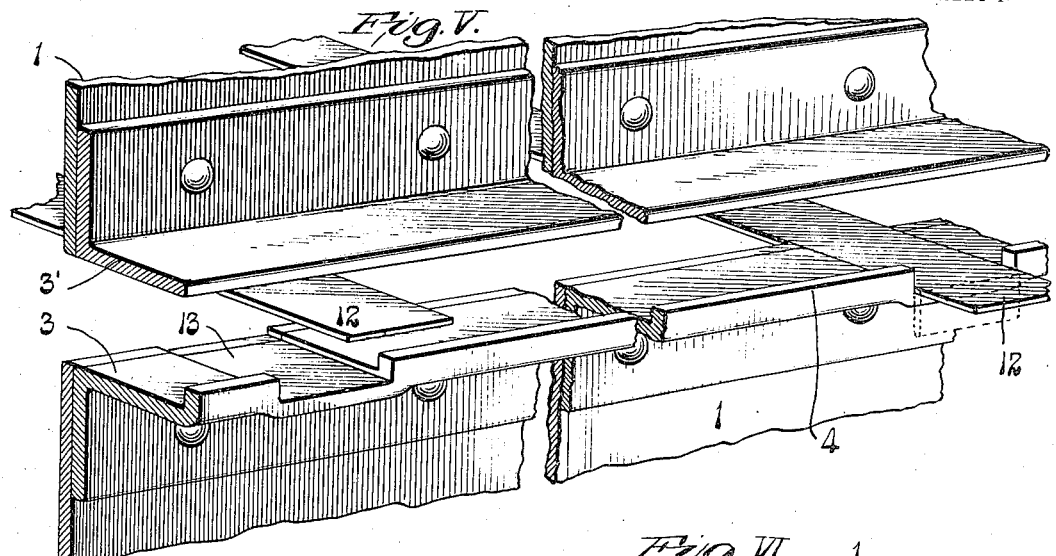
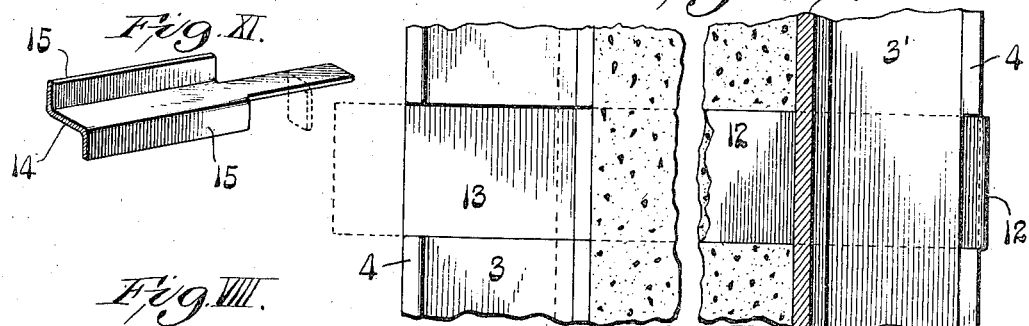
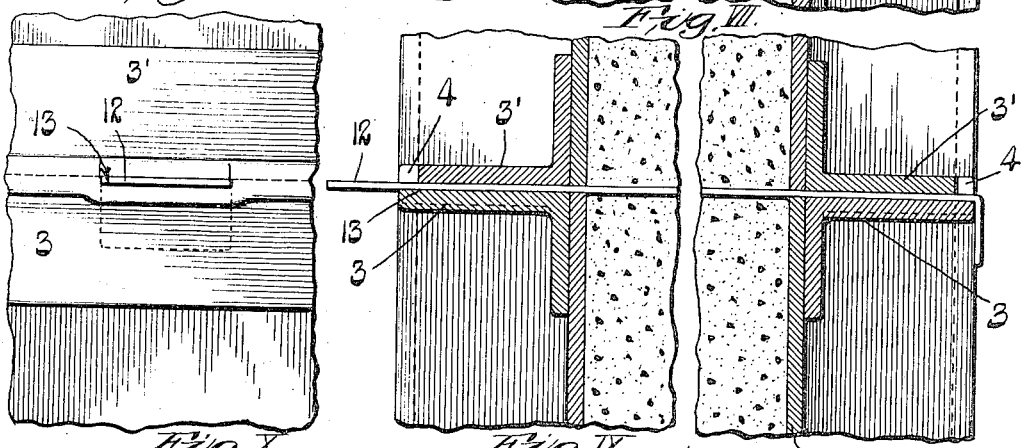
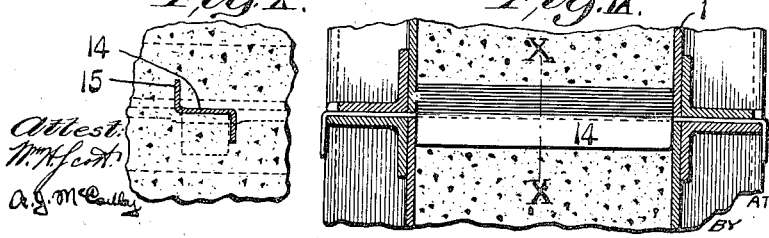

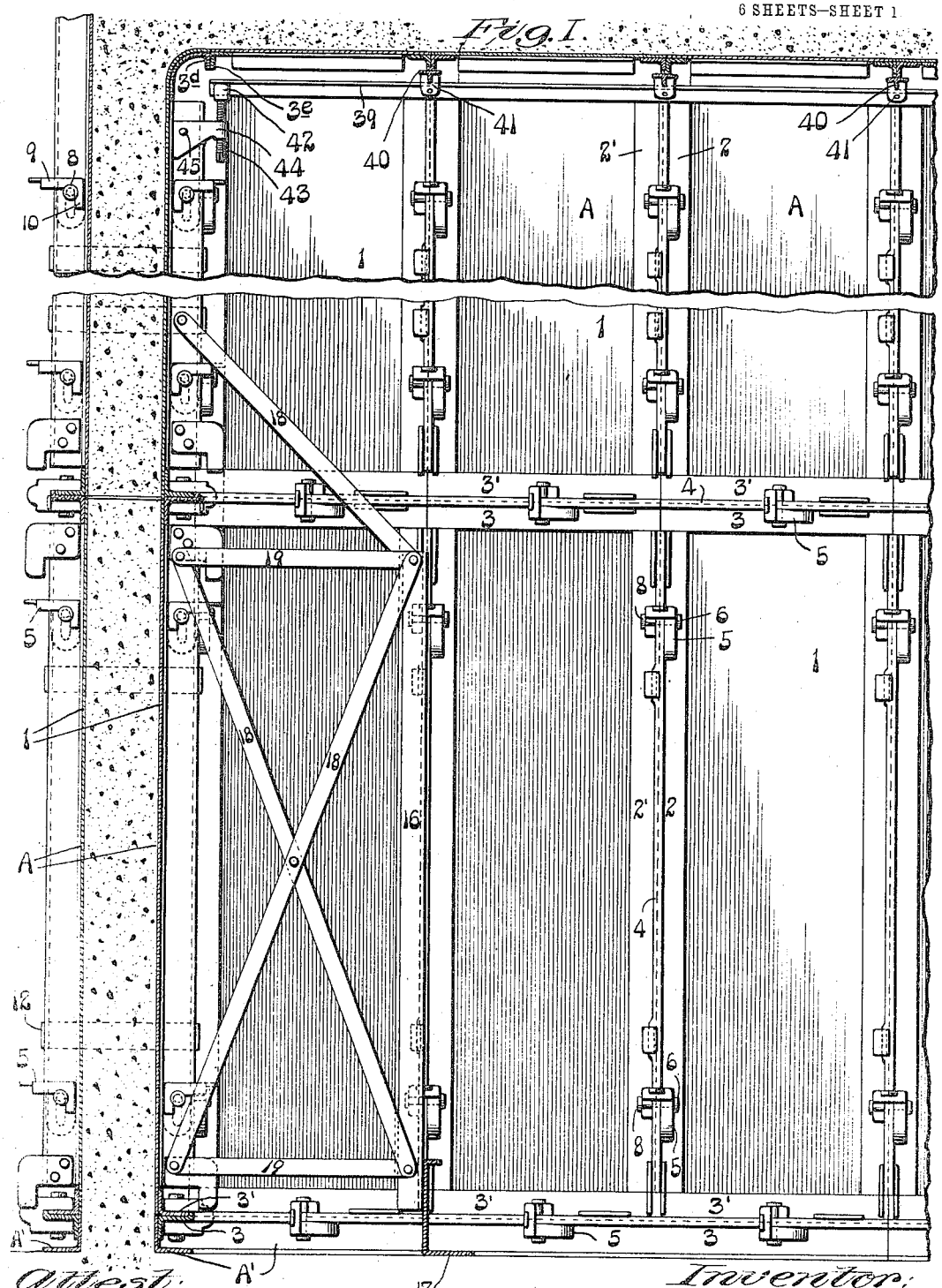

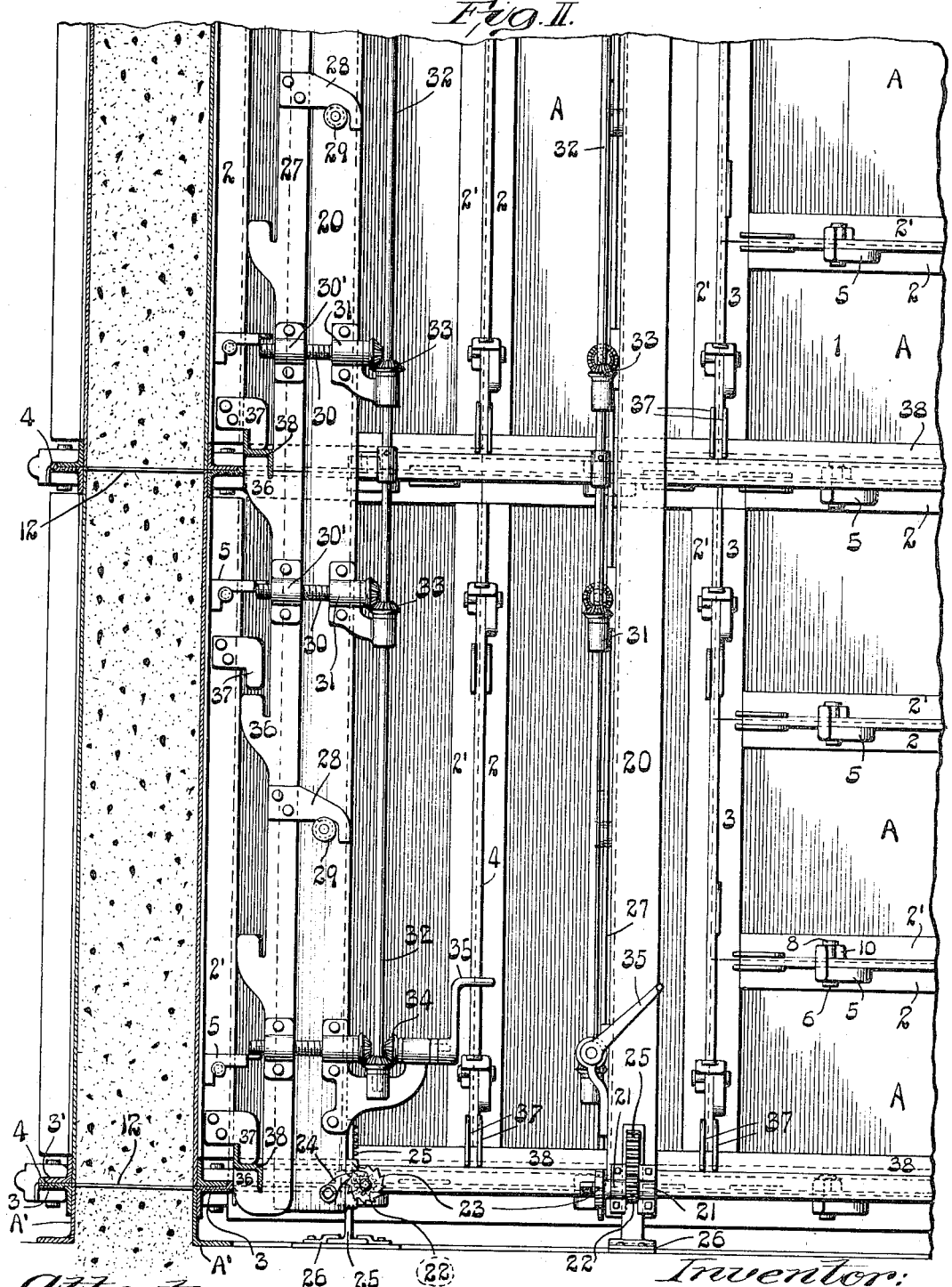

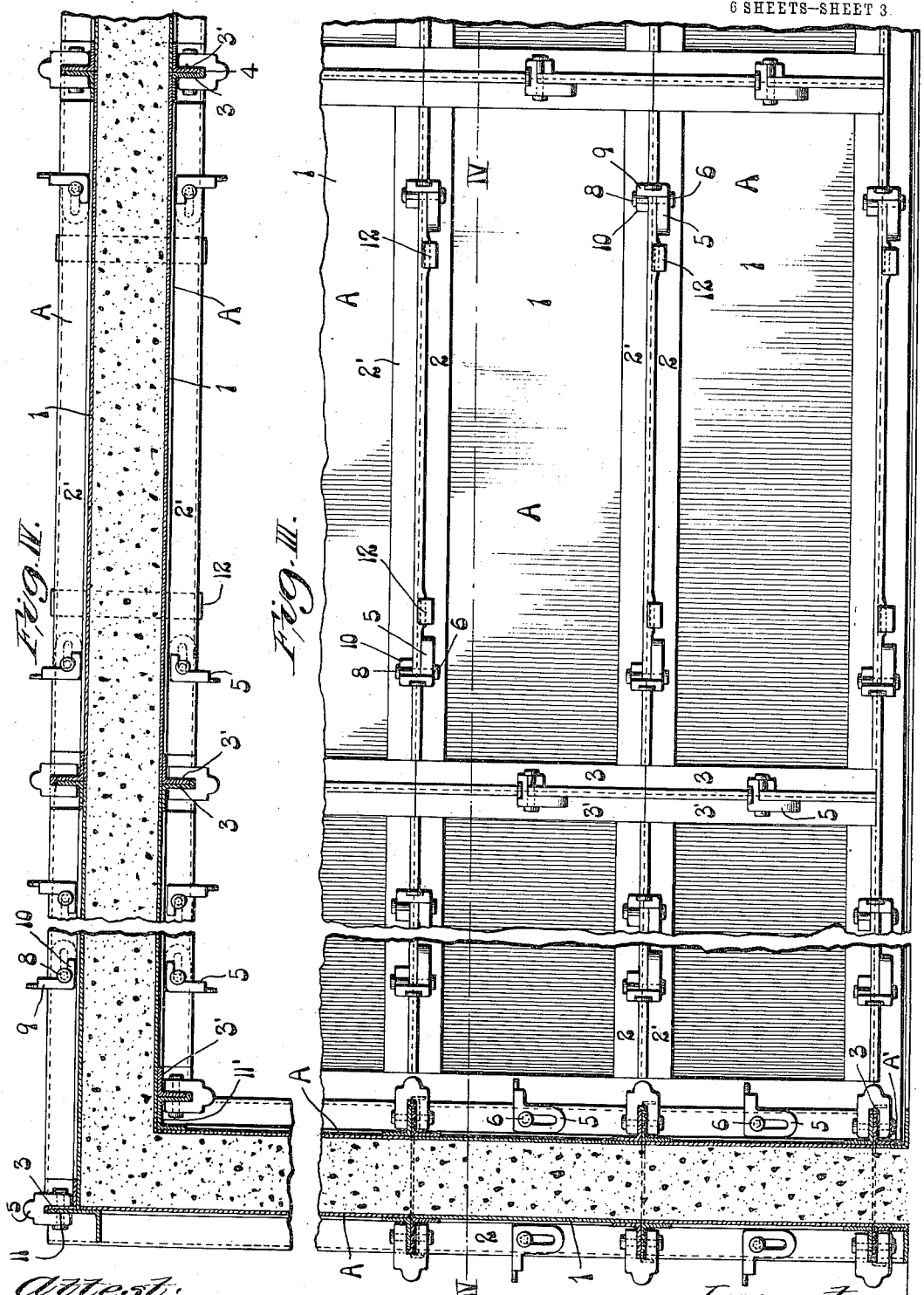

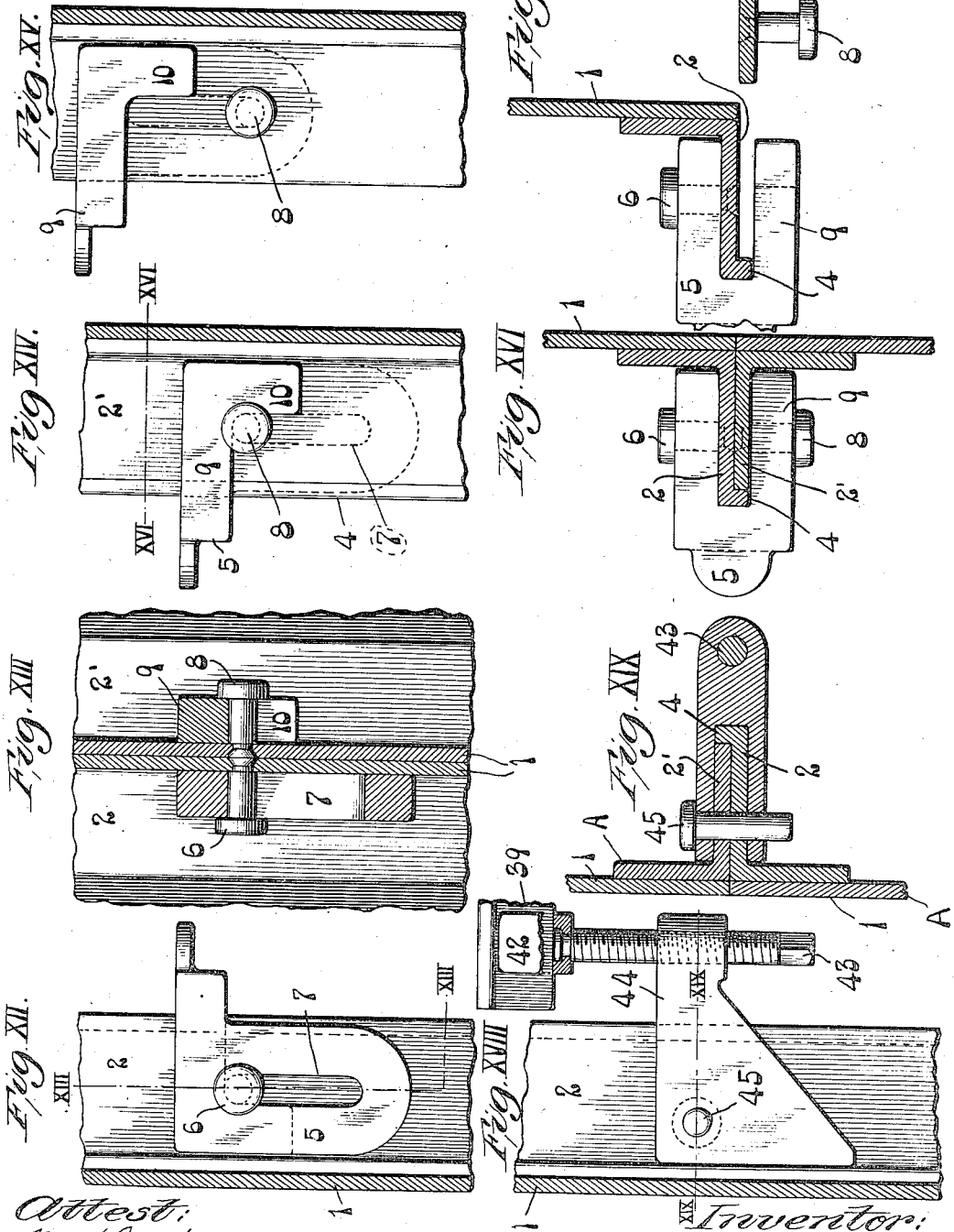

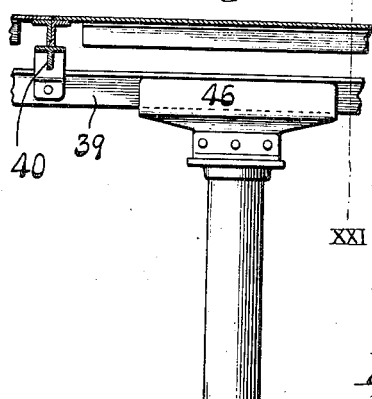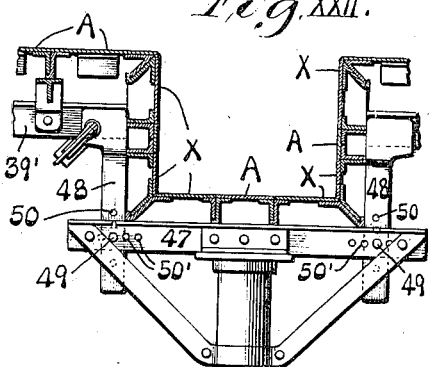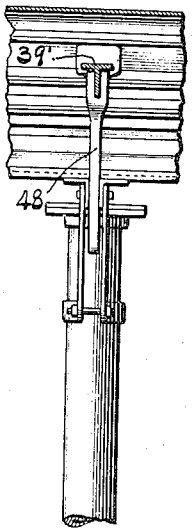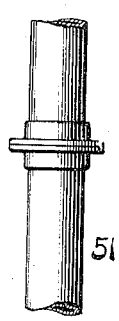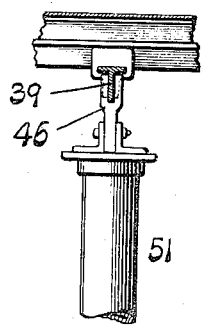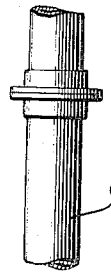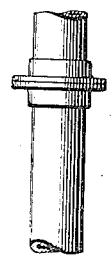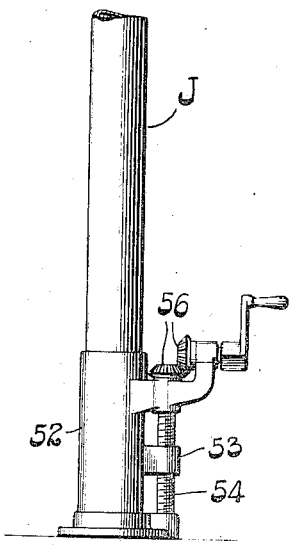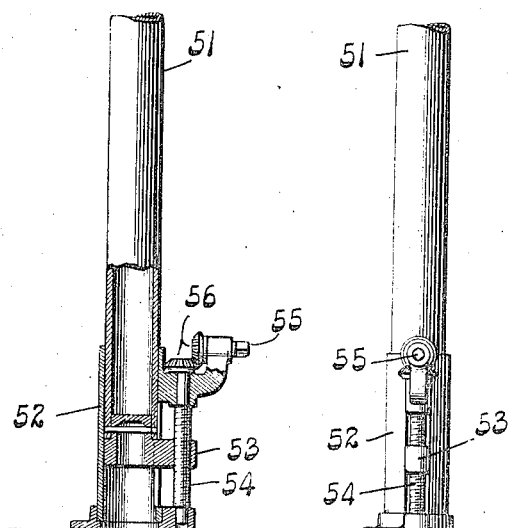

UNITED STATES PATENT OFFICE.

CHARLES H. WITTHOEFFT, OF ST. LOUIS, MISSOURI, ASSIGNOR TO WITTHOEFFT COLLAPSIBLE CONCRETE FORMS COMPANY, OF ST. LOUIS, MISSOURI, A CORPORATION OF MISSOURI.

FORM AND MOLD FOR MAKING CONCRETE BUILDINGS.

1,013,632.          Specification of Letters Patent.        Patented Jan. 2, 1912.

Application filed November 17, 1910. Serial No. 592,788.

*To all whom it may concern:*

Be it known that I, CHARLES H. WITTHOEFFT, a citizen of the United States of America, residing in the city of St. Louis and State of Missouri, have invented certain new and useful Improvements in Forms and Molds for Making Concrete Buildings, of which the following is a full, clear, and exact description, reference being had to the accompanying drawings, forming part of this specification.

My invention relates to a form and mold for use in constructing walls, ceilings, or other parts of buildings, the present invention contemplating a form and mold of the same general description as that contemplated in my previous improvements, for which Letters Patent in the United States Nos. 916,083 and 916,084 were issued March 23, 1909. Cross reference is made to another application Serial Number 592,789, filed by me, of even date herewith.

One of the objects of my present invention is the production of a built up form and mold comprising very simple sections that may be easily and quickly secured to each other and readily mounted in position for service, and dismounted when they have served their purposes.

Another object is to provide novel adjustable means for supporting and bracing the section mold.

Other objects are contemplated by the improvement, as will more fully hereinafter appear.

The form and mold to which my invention pertains is so made, structurally, as to render it possible to produce building structures of various descriptions so that when the form mold has been in service and is removed from a molded structure after the concrete in the structure has hardened, a completely finished wall or entire body of a house, or the like, which may be of any desired shape or design or style of architecture, is produced.

Figure I is a vertical section, showing the form and mold sections united to form walls and ceiling, one of the wall sections being shown in elevation. Fig. II is a view similar to Fig. I, illustrating an adjustable brace. Fig. III is a view similar to Fig. I, showing a slight modification. Fig. IV is a horizontal section taken on line IV—IV, Fig. III. Fig. V is a perspective view showing the marginal edges of a pair of sections, and tie bars between said sections. Fig. VI is a horizontal section showing a tie bar and forms and molds adapted to be connected thereby. Fig. VII is a vertical section showing a tie bar partially locked in position. Fig. VIII is a side elevation of the parts shown in Fig. VII. Fig. IX is a view similar to Fig. VII, illustrating a combined tie bar and spreader. Fig. X is a section taken on line X—X, Fig. IX. Fig. XI is a perspective view of a portion of the combined tie bar and spreader. Fig. XII is a fragmentary view illustrating a clip for connecting adjacent sections. Fig. XIII is a vertical section taken approximately on line XIII—XIII, Fig. XII. Fig. XIV is a fragmentary view showing the side of the clip opposite to that shown in Fig. XII. Fig. XV is a view similar to Fig. XIV showing the clip released from one of the sections. Fig. XVI is a horizontal section taken on line XVI—XVI, Fig. XIV. Fig. XVII is a horizontal section showing the clip released and the mold sections separated from each other. Fig. XVIII is a side elevation, partly in section, showing a support for the ceiling mold secured to the wall mold. Fig. XIX is a section on line XIX—XIX, Fig. XVIII. Fig. XX is a side elevation of a support for the ceiling mold. Fig. XXI is a section taken on line XXI—XXI, Fig. XX. Fig. XXII is an elevation, partly in section, showing a modified form of ceiling mold and a support therefor. Fig. XXIII is a side elevation of the parts shown in Fig. XXII.

In the accompanying drawings: A designates mold sections, each of which comprises a mold plate 1 having its marginal portions reinforced by angles 2, 2', 3, and 3'. The sections A forming molds for the concrete wall shown in Figs. I and II may be exact duplicates of each other, and to produce a mold of the required height, base sections A' of the proper dimensions may be arranged below the sections A. The base sections A' rest on the floor of the building and have reinforcing angles 3 at their upper edges.

The various mold sections are adapted to interlock with each other, and each section is provided with locking devices by which it may be secured to other sections. The reinforcing angles are provided with flanges projecting laterally from the edges of the mold plate and each angle 2 has a lip 4 which overlaps and interlocks with the projecting flange of an angle 2' (see Fig. XVI). Each section A has an angle 2 at one of its longitudinal edges, and an angle 2' at its opposite edge. The angle 3 which extends across one end of the mold plate has a lip 4 at its outer edge, and is of the same shape as the angle 2, the angle 3' being shaped like the angle 2' so as to interlock with an angle 2 or 3.

Clips 5, for connecting the various sections, are permanently but adjustably secured to the angles 2 and 3 by means of pins 6 which pass through slots 7, (Figs. XII to XVIII). The projecting flanges of angles 2' and 3' are provided with lugs or pins 8 to which the clips 5 may be secured, each clip having an arm 9 provided with a finger 10 which lies behind a pin 8 when the sections are locked together. The clips 5 embrace or straddle the mating flanges of adjacent sections, as seen in Fig. XVI, and in addition to serving as locking devices for uniting the various sections, they cause the adjacent edges of the sections to firmly engage each other. It is further to be noted that the clips 5 serve to aline the mold plates so that their molding surfaces will be flush with each other. This service is performed by the clips due to their being slidable longitudinally of the mold plate flanges, being provided with the slot and pin and hook and pin engagement with the mold plate flanges and movable against the front faces of the mold plates, i. e., the bases of the flanges. The clips, therefore, are movable in part between the pins and the front faces of the mold plates and when they are moved longitudinally, as permitted by the slots therein, the portions of the clips that move between the pins and mold plates effect the very desirable alinement of the plates. The sections may be disconnected by moving the clips to the position shown in Fig. XV, wherein the finger 10 is released from the pin 8, and the sections may then be separated as seen in Fig. XVII.

The sections A may be positioned as shown in Fig. I wherein their longitudinal edges are vertical, or as seen in Fig. II wherein a portion of the mold is formed by vertically arranged sections and another part thereof is formed by horizontally arranged sections, the angles 3 at the ends of the horizontal sections being secured to angles 2' at the side edges of the adjacent vertical sections; or as shown in Fig. IV, wherein all of the sections are arranged horizontally. The section at the inside corners of the mold may be provided with a flanged reinforcing member 11' (Fig. IV) which overlaps an adjacent section and interlocks with an angle 3' carried thereby. The clips 5 at the outside corners of the mold (Fig. IV) are permanently secured to an angle 3', and removably connected to a flange 11' which projects from the adjacent section. The base section A' (Fig. II), which rests on the floor has an angle 3 at its upper edge, and is connected to an angle 3' on the next adjacent section by clips 5.

The inner and outer wall molds, which are spaced apart to receive the concrete, may be connected together by tie bars 12 (Figs. V to VIII). The tie bars 12 are arranged between adjacent mold sections, one of the sections being provided with recesses 13 for the reception of said bars. After being inserted through recesses 13, the bars may be locked in position by bending their ends, as shown at the right hand side of Fig. VII.

Figs. IX to XI illustrate a combined tie member and spreader 14 which may be used to connect the molds, as just described, and at the same time space said molds apart a predetermined distance. The member 14 has a rigid middle portion of Z-shape in cross section, being provided with flanges 15 which lie between the molds, and has flexible non-flanged end portions which lie between adjacent mold sections, the extreme ends of said flexible portions being bent downwardly, in practice, as shown in Fig. IX. By bending the tie bars, as shown, they firmly connect the upper ends of sections provided with angles 3, and the sections which rest on said angles are prevented from moving outwardly by the lugs 4.

Fig. I illustrates a mold brace comprising a vertical beam 16 secured to a horizontal beam 17, the latter being secured to the floor. Diagonal bars 18 and horizontal bars 19 connect the ends of the beam 16 to the wall mold.

The mold braces shown in Fig. II are adjustable and have a number of advantages not present in the rigid structure just described. These adjustable braces comprise vertical beams 20, each having bearings 21 at its lower end which support a shaft carrying a pinion 22. This shaft is provided with a ratchet wheel 23 that may be locked by a pawl 24. Rack bars 25, meshing with pinions 22, constitute supports for the beams 20, said rack bars having flanged lower ends slidably fitted to guides 26, the latter being secured to the floor.

27 designates a movable brace member provided with arms 28 which rest on rollers 29 mounted on the vertical beam 20. Adjusting screws 30, passing through threaded blocks 30' on the movable brace member, are rotatably mounted in bearings 31, said bearings being secured to the beam 20. A vertical shaft 32 is provided with pinions 33 which mesh with pinions on the adjusting screws. The shaft 32 may be rotated to operate the adjusting screws through the medium of a pinion 34 to which an operating handle 35 is connected.

After the mold sections have been assembled, the movable brace member 27 is adjusted to engage said sections, as seen in Fig. II, and when in this position recessed projections 36 carried by the movable brace member are arranged directly below fingers 37 secured to the mold sections. The projections 36 and fingers 37 are then locked together by long flanged beams or Z-bars 38. Each Z-bar 38 extends across a number of the mold sections A, firmly locks said sections to the movable brace members, and reinforces the mold at points where the mold sections are connected together. Any desired number of vertical beams 20 and movable brace members 27 may be employed to support and reinforce the Z-bars. The ceiling mold (Fig. I) is formed of sections which may be exact duplicates of the sections A. The upper end of the inner wall mold is preferably bent or otherwise shaped, to engage the ceiling mold, the wall mold herein shown having a flange 3ᵈ at its upper end which engages a flange 3ᵉ at the edge of the ceiling mold, and these flanges may be connected by the clips 5. The ceiling mold shown in Fig. I is supported by a frame consisting of bars 39 and 40, connected together at 41, the ends of bars 39 being mounted on saddles 42 carried by screws 43. The screws 43 are fitted to brackets 44 removably connected to mold sections A by pins 45, (see Figs. XVIII and XIX).

Figs. XX and XXI illustrate a jack J forming a support for the ceiling mold, the upper movable member of this jack being provided with a recessed saddle 46 which constitutes a seat for the bar 39. The mold shown in Figs. XXII and XXIII is composed of sections A and X secured together to form beam ribs. All of these sections have flanges adapted to be connected by clips 5 in the manner previously described. The means for supporting these ceiling beam rib sections comprise saddle bars 47 secured to the upper members of jacks J' and to which upright stays 48 are adjustably connected by pins 49. The upright stays 48 and beam 47 are each provided with a series of openings 50 and 50' for the reception of the connecting pins 49 and they may therefore be adjusted to fit beam rib molds of different dimensions. Each upright stay is recessed to receive the ceiling supporting bars 39'. The jacks J and J' are composed of upper movable members 51, telescopically mounted in stationary bases 52, and having threaded blocks 53 secured to their lower ends. The movable members of the jacks may be operated by screws 54 passing through the threaded blocks 53 and connected to operating shafts 55 by bevel gears 56. It will be understood that by the use of these jacks J and J' I provide supports for a ceiling mold that may be readily adjusted to suit the height of the ceiling, that is to be produced; and, further, that when the ceiling mold is to be taken down, it may be readily lowered to free it from the concrete by the simple operation of the jacks.

I claim:—

1. An apparatus of the character described, comprising a mold member, a stationary beam, a brace member movably mounted on said beam, means for moving said brace member toward the mold member, and reinforcing bars interlocked with said brace member and mold member.

2. An apparatus of the character described, comprising a mold member, a stationary beam, a brace member movably mounted on said beam, adjusting screws for operating said brace member, means for causing all of said adjusting screws to operate in unison, and reinforcing bars each having flanges which interlock with said mold and brace members.

3. An apparatus of the character described, comprising a mold member provided with projections, a stationary brace member, a movable brace member secured to the stationary member, said movable member having projections, and flanged reinforcing bars interposed between the mold member and said movable member, the flanges of said reinforcing bars being interlocked with the projections on said mold member and movable member.

4. An apparatus of the character described, comprising a mold member provided with fingers, a stationary beam, a brace member movably mounted on said beam, said brace member being provided with recesses, means for moving said brace member toward the mold, and reinforcing bars connecting said brace member to the mold member, each of said reinforcing bars having flanges, one of which is interlocked with fingers on the mold member, the other flange being arranged in a recess in said movable brace member.

5. In a mold of the character described, mold plates provided with flanges, the flanges of adjoining mold plates being arranged together in pairs, and means for connecting said flanges comprising bifurcated clips, each clip being provided with an arm having slot and pin connection with one of a pair of said flanges and another arm provided with a hook, one flange of each pair of flanges mating with that with which the mating clip has slot and pin connection being provided with a pin to which the hook of the clip is interlocked when the flanges are held in assemblage by the clip.

6. In a mold of the character described, mold plates provided with flanges mating together in pairs, and means connecting said flanges to unite said sections, said means comprising bifurcated clips straddling the flanges, one arm of each clip being provided with a slot extending longitudinally thereof and the other arm of the clip being provided with a finger parallel with a wall of said slot, a pin carried by one of the flanges and to which the slotted arm of the clip is fitted, and a pin carried by the other flange for receiving the hook of the clip when the clip is moved longitudinally.

7. In a mold of the character described, mold plates provided with flanges, the flanges of adjoining mold plates being arranged together in pairs, and bifurcated clips straddling said flanges to connect them; the clips being movable longitudinally of the flanges connected thereby, and the flanges being provided with means engaged by the clips between which and the outer faces of the mold plates the arms of the clips are adapted to ride to aline the mold plates.

8. In a mold of the character described, mold plates provided with flanges, the flanges of adjoining mold plates being arranged together in pairs, and bifurcated clips straddling said flanges to connect them; the clips being movable longitudinally of the flanges connected thereby, and the flanges being provided with pins engaged by the clips between which and the outer faces of the mold plates the arms of the clips are adapted to ride to aline the mold plates.

9. In a mold of the character described, mold plates having flanges arranged together in pairs, the flanges being provided with pins projecting from their sides, and bifurcated clips straddling said flanges to connect them; one arm of each clip being provided with a longitudinal slot receiving a pin carried by one of a pair of flanges and the other arm of each clip having a hook with an inner wall parallel with a wall of the slot in the first arm engaging a pin carried by the second flange, the clips being slidable longitudinally of said flanges and their arms being of such width between the pins and the outer faces of the connected mold plates as to cause them to press against both said pins and said outer faces to aline the mold plates.

CHAS. H. WITTHOEFFT.

In the presence of—
A. J. McCauley,
E. B. Linn.